United States Patent [19]

Braschos

[11] Patent Number: 4,474,295

[45] Date of Patent: Oct. 2, 1984

[54] APPARATUS FOR SORTING OUT PACKAGE UNITS IDENTIFIED AS DEFECTIVE

[76] Inventor: Karl-Heinz Braschos, Dr.-Ernst-Strasse 23, D-5900 Siegen, Fed. Rep. of Germany

[21] Appl. No.: 272,699

[22] Filed: Jun. 11, 1981

[30] Foreign Application Priority Data

Mar. 20, 1981 [DE] Fed. Rep. of Germany ....... 3110883

[51] Int. Cl.³ .......................... B07C 5/36; B65G 47/46
[52] U.S. Cl. .................................. 209/653; 198/372; 198/436
[58] Field of Search ................................ 209/651–654, 209/656, 657, 925, 559, 563, 564; 198/366, 369, 370, 372, 436, 597

[56] References Cited

U.S. PATENT DOCUMENTS

| | | | |
|---|---|---|---|
| 878,603 | 2/1908 | Blakeslee | 198/442 X |
| 1,763,809 | 6/1930 | Murphy | 198/442 X |
| 2,998,117 | 8/1961 | Newburn | 209/652 X |
| 3,020,997 | 2/1962 | Schell | 198/425 X |
| 3,038,606 | 6/1962 | Leaver et al. | 209/559 X |
| 3,270,881 | 9/1966 | Calhoun | 209/925 X |
| 3,471,012 | 10/1969 | Calhoun | 209/653 X |
| 3,771,648 | 11/1973 | Revuelta | 198/372 X |
| 4,256,214 | 3/1981 | Back, Jr. | 198/370 X |
| 4,273,235 | 6/1981 | Rustand | 198/372 |

*Primary Examiner*—Robert B. Reeves
*Assistant Examiner*—Edward M. Wacyra
*Attorney, Agent, or Firm*—Young & Thompson

[57] ABSTRACT

Apparatus for sorting out package units identified as defective by deflecting same from a first horizontal belt to a second belt traveling in parallel, comprises a ram activated at exact times by a detection station for defective package units. The ram has on its free end a roller rotatably mounted about a vertical axis. Preferably, two rollers are arranged in superposition and axial alignment at the free end of the ram in such a way that the center of gravity of each package unit lies in a horizontal plane between the two rollers. Each roller has a circumferential cover of foam rubber or sponge rubber or the like. The rollers project in their rest position a small distance into the path of the package units.

2 Claims, 2 Drawing Figures

APPARATUS FOR SORTING OUT PACKAGE UNITS IDENTIFIED AS DEFECTIVE

The invention relates to an apparatus for the selective ejection of package units identified as being defective, by deflecting them from a first horizontal belt to a second belt, traveling in parallel and in synchronism therewith, by means of a ram activated at exact times by a detection station for defective package units.

Apparatus of this type is conventional wherein deflection segments are provided which are fixedly mounted in the travel direction of the package units but can be extended and retracted at right angles thereto, these segments forming in series a deflecting surface for package units and being operated continuously in succession, if a package unit is to be sorted out from a first conveying route onto a second conveying route. Such an apparatus is described, for example, in DOS (German Unexamined Laid-Open Application) No. 2,917,286.

By contact made by the package units (chiefly bottles primarily involved) with the surfaces which are stationary in the travel direction of the bottles, the bottles or the like are braked so that the bottles can jam up, because the bottles then execute a relative motion with respect to the belt. It is extremely difficult to take this effect into account when adjusting the operating speed of the deflection segments, fashioned as pushers, to the speed of the belt. This is so, because the bottles have a different friction coefficient dependent on the surface characteristics of the bottles, which latter can be rough, smooth, or provided with a superficial relief, and furthermore on the degree of filling and thus on the varying weights thereof. This can lead to disturbance of synchronism and an inaccurate deflection of the package units.

DOS No. 2,924,312 describes an apparatus for sorting out package units detected as defective wherein pusher elements are mounted to be selectively pivotable about horizontal axes on an endless chain traveling obliquely to the first belt about vertical axes. This apparatus operates excellently at high conveying speed in large-scale plants, but is too voluminous for the medium and small scale applications where simpler and compact devices are desirable.

The present invention has for its object to provide a compact, safely operating sorting apparatus not affected by varying weights and surface characteristics of the package units.

This object is attained according to this invention, starting with the apparatus explained hereinabove, by providing the ram at the free end with a roller supported to be rotatable about a perpendicular, preferably vertical, axis.

Preferably, two rollers are arranged at the free end of the ram in superposition so that the center of gravity of each package unit lies in a horizontal plane between the two rollers.

The roller, or each roller, preferably has a circumferential cover of foam rubber or the like.

The roller or rollers can be mounted to be freely rotatable or they can also be rotationally driven in synchronism with the conveying speed of the package units.

By means of the apparatus of this invention, the bottles or the like are not braked and thus do not experience a relative movement with respect to the belt in the conveying direction.

A suitable further development of the invention is also to be seen in that the roller or rollers in the rest position projects or project a short distance into the conveying path of the package units. The advantage of this arrangement will be pointed out hereinbelow.

To operate the ram, a pressure medium cylinder is provided, particularly a pneumatic cylinder.

The drawing shows one embodiment of the invention, to wit:

Figure 1:
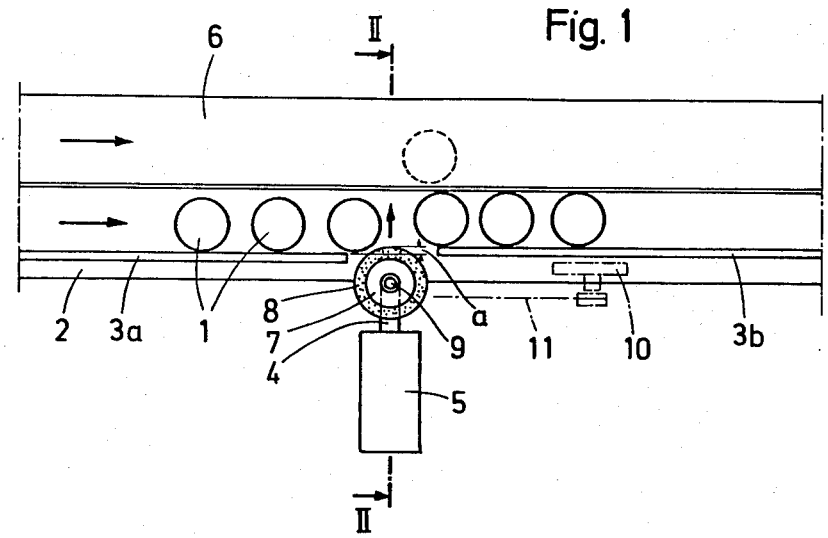
FIG. 1 is a schematic top view of an apparatus according to the invention.
Figure 2:
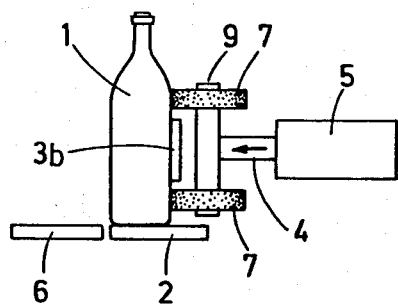
FIG. 2 is a section along line II—II in FIG. 1.

According to FIG. 1, package units, e.g. bottles 1, are conveyed at uniform mutual spacings in the direction of the arrow from a detection station (not illustrated) by means of a first belt 2. A guide rail 3a, 3b ensures that the bottles 1 arrive in alignment at a ram 4 which latter is operated, for example, by a pneumatic cylinder 5 controlled by the detection station, namely at the instant at which a bottle 1 to be sorted out arrives at the ram 4. By means of the ram 4, this bottle 1, identified as defective, is pushed onto a second belt 6 extending directly beside the first plate belt 2 in parallel thereto and being normally driven at the same velocity.

The ram 4 has at the free end a roller or, even better, as illustrated, two rollers 7 with respectively one circumferential cover 8 of sponge rubber or foam rubber or the like (FIG. 1). The two rollers 7 are either supported to be freely rotatable about a perpendicular vertical axle 9, using suitably low-friction roller bearings for this purpose, or they are driven by a drive mechanism, indicated purely schematically in FIG. 1 by dot-dash lines, so that their peripheral speed corresponds to the linear velocity of the bottles 1 or the like. The drive could be provided by a friction wheel 10 driven directly by the first plate belt 2 and thus driving the rollers 7 at all times at the appropriate speed by way of a corresponding drive coupling 11. However, even freely rotatable rollers 7 are sufficient to ensure that the bottles 1 are not braked while coming into contact with the rollers 7 and thus do not execute any relative motion with respect to the plate belt 2 in the conveying direction.

To deflect a bottle 1 to be sorted out, the ram 4 needs to traverse only a relatively small distance horizontally at right angles to the conveying direction of the belts 2, 6, the ram then quickly retracting again before it is reached by the subsequent bottle 1. The two rollers 7 are arranged in vertical superposition at such a spacing from each other that the center of gravity of a bottle 1 is always in a horizontal plane between the two rollers 7.

As shown in FIG. 1, the periphery of the covers 8 of the rollers 7 extends a small distance a into the conveying path of the bottles 1. This has the effect that all bottles (even those which are not defective) touch the rollers 7 and already receive from these rollers a small motion component in the deflection direction at right angles to the conveying direction, so that they move on, in the conveying direction downstream of the ram 4, along the first plate belt 2 somewhat offset with respect to the second plate belt 6. This arrangement has the essential advantage that the ram 4 meets a bottle 1 to be deflected while in the sliding friction condition, rather than having to move this bottle against the starting friction in the rest position, which is greater.

For the dimension a, 2 mm are sufficient in many cases.

What is claimed is:

1. Apparatus for sorting out package units identified as defective, by deflecting same from a first horizontal belt on which the units rest, to a second horizontal coplanar belt traveling in parallel and in synchronism therewith, comprising a ram which is activated at exact times by a detection station for defective package units to reciprocate the ram horizontally across the first belt to push defective package units from the first belt onto the second belt, the ram having at its free end at least one roller, means mounting said at least one roller to be rotatable about a vertical axis, and means driving said at least one roller rotatably in synchronism with the conveying speed of the package units.

2. Apparatus for sorting out package units identified as defective, by deflecting same from a first horizontal belt on which the units rest, to a second horizontal coplanar belt traveling in parallel and in synchronism therewith, comprising a ram which is activated at exact times by a detection station for defective package units to reciprocate the ram horizontally across the first belt to push defective package units from the first belt onto the second belt, the ram having at its free end at least one roller, and means mounting said at least one roller to be rotatable about a vertical axis, said at least one roller projecting in the rest position a small distance into the conveying path of the package units so as to give to all the package units a small motion component in the deflection direction at right angles to the conveying direction.

* * * * *